(12) United States Patent
Terazawa et al.

(10) Patent No.: US 6,602,965 B1
(45) Date of Patent: Aug. 5, 2003

(54) METHOD OF CONTINUOUS CATIONIC LIVING POLYMERIZATION

(75) Inventors: Hiromu Terazawa, Kobe (JP); Shun Wachi, Takasago (JP); Naoki Furukawa, Himeji (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/980,778

(22) PCT Filed: Jun. 8, 2000

(86) PCT No.: PCT/JP00/03703

§ 371 (c)(1),
(2), (4) Date: Mar. 22, 2002

(87) PCT Pub. No.: WO00/75193

PCT Pub. Date: Dec. 14, 2000

(30) Foreign Application Priority Data

Jun. 8, 1999  (JP) ............................................ 11-161122

(51) Int. Cl.$^7$ .................................................. C08F 2/06
(52) U.S. Cl. ...................... 526/64; 526/206; 526/329.2; 526/346; 526/348.7; 526/65
(58) Field of Search ...................... 526/64, 206, 329.2, 526/346, 348.7

(56) References Cited

U.S. PATENT DOCUMENTS

| | | | |
|---|---|---|---|
| 4,568,732 A | * | 2/1986 | Kennedy et al. ............. 526/206 |
| 4,946,899 A | | 8/1990 | Kennedy et al. |
| 5,236,998 A | | 8/1993 | Lundeen et al. |
| 5,527,870 A | | 6/1996 | Maeda et al. |
| 6,013,735 A | | 1/2000 | Mishra et al. |

FOREIGN PATENT DOCUMENTS

| | | |
|---|---|---|
| JP | 5-202104 | 8/1993 |
| JP | 5339326 | 8/1993 |
| JP | 5-317067 | 12/1993 |
| JP | 6-298843 | 10/1994 |

OTHER PUBLICATIONS

Nagy A. Faust R. Kennedy J. P.: "living Carbocationic Polymerization: VI Continuous Living Polymerization of Isobutylene by a Bifunctional Initiator" Polymer Bullettin, vol. 15, No. 5, pp. 411–416, XP002220599 Berlin *p. 413, line 8–line 12*.

Polymer Bulletin Springer–Verlag 1985 New Telechelic Polymers and Sequential Copolymers by Polyfunctional Initiator Transfer Agents (Inifers) 44. End–Reactive Three–Arm Star Polyisobutylenes by Continous Polymerization; vol. 13, pp. 91–102 (1985).

Polymer Bulletin Springer–Verlag 1985 Inifers New Telechelic Polymers and Sequential Copolymers by Polyfunctional Initiator Transfer Agents (Inifers) 48. Continuous Synthesis of Linear Telechelic Polyisobutylenes; vol. 14, pp. 251–257 (1985).

Polymer Bulletin Springer–Verlag 1993 Living Carbocationic Polymerization LX. Continuous process for the synthesis of tert–chlorine ended polyisobutylene (PIB–Cl); vol. 31, pp. 255–261 (1993).

Polymer Bulletin Springer–Verlag 1986 Cationic Polymerization Living Carbocationic Polymerization VI. Continuous Living Polymerization of Isobutylene by a Bifunctional Initiator; vol. 15, pp. 411–416–(1986).

* cited by examiner

*Primary Examiner*—David W. Wu
*Assistant Examiner*—William Cheung
(74) *Attorney, Agent, or Firm*—Sughrue Mion, PLLC (57) ABSTRACT

A polymer is produced by feeding a polymerization initiator, a cationically polymerizable monomer component and a catalyst continuously to a flow-through stirring vessel reactor to thereby allow the living polymerization to initiate and feeding a reaction solution from said flow-through stirring vessel reactor to a flow-through tubular reactor continuously to thereby allow the living polymerization to proceed, said reaction solution having a conversion rate of said cationically polymerizable monomer component of not less than 1% by weight to less than 90% by weight.

11 Claims, 5 Drawing Sheets

METHOD OF CONTINUOUS CATIONIC LIVING POLYMERIZATION

This is a National Stage Application filed under §371 of PCT Application No. JP00/03703 filed Jun. 8, 2000; the noted prior application is hereby incorporated by reference; the international application to which benefit is claimed was not published under PCT article 21(2) in English.

TECHNICAL FIELD

The present invention relates to a method of continuous cationic living polymerization. More particularly, it relates to a method comprising continuously feeding raw materials to thereby cause the polymerization reaction to proceed and continuously discharging the product.

BACKGROUND ART

Living polymerization is a mode of polymerization in which the polymerization reaction initiated at a starting point(s) on an initiator can proceed without being disturbed by such side reactions as termination and chain transfer reactions and thus allows the molecular chain to grow. If, in such living polymerization, the polymerization reactions from all initiation sites are started simultaneously, a polymer uniform in molecular weight can be obtained and, further, it is possible to introduce a specific functional group terminally or otherwise into the polymer or synthesize a block copolymer by adding a different monomer species near the end point of the polymerization reaction. According to the monomer species to be polymerized, there are known cationic living polymerization (e.g. Japanese Kokai Publication Hei-07-292038, Japanese Kokai Publication Hei-08-53514), anionic living polymerization (e.g. Japanese Kokai Publication Hei-05-247199) or living radical polymerization (e.g. Japanese Kokai Publication Hei-10-306106).

The growing terminus in cationic living polymerization need not be always a carbocation but may be in a nonionic state as a result of binding of the carbocation to a counter anion during the polymerization reaction. In a cationic living polymerization system, termini in the ionic state (i.e. carbocation) and termini in the nonionic state are in equilibrium in many cases and, in such cases, the active carbocation termini react with the monomer. Thus, the term "cationic living polymerization" includes the one strictly classifiable under pseudo-living polymerization. Such cationic living polymerization is carried out at relatively low temperatures in many cases and, as regards the catalyst and additive, ideas proper to respective polymerization systems have been given. Concerning the cationic living polymerization of isobutylene, the result of the evaluation of the distribution (Mw/Mn), which is the ratio of weight based average molecular weight (Mw) to number based average molecular weight (Mn), was 1.09 to 1.38 in Japanese Kokai Publication Hei-07-292038, or in Japanese Kokai Publication Hei-08-53514, the distribution was 1.07 to 1.33, for instance, and, in these systems, polymers uniform in molecular weight are obtainable.

While most of the reports made about conventional cationic living polymerization reactions deal with batchwise polymerization processes in which a stirring vessel reactor is charged with raw reactant materials, attempts have also been made about the continuous polymerization process in which raw materials are continuously fed to a reactor in order to improve the productivity. Thus, in U.S. Pat. No. 4,568,732 and Nagy et al. (Polymer Bulletin, 13, pp. 97–102, 1985; Polymer Bulletin, 14, pp. 251–257, 1985), for instance, attempts were made to carry out cationic living polymerization by continuously feeding a polymerization initiator and a Lewis acid catalyst and isobutylene to one stirring vessel reactor. Majoros et al. (Polymer Bulletin, 31, pp. 255–261, 1993) connected three stirring vessel reactors in series and fed isobutylene continuously thereto to thereby effect polymerization. Further, Nagy et al. (Polymer Bulletin, 15, pp. 411–416, 1986) carried out cationic living polymerization of isobutylene by means of continuous polymerization in a tubular reactor. In Japanese Kokai Publication Hei-06-298843, there is proposed a method which comprises carrying out cationic living polymerization of isobutylene by means of continuous polymerization using a shell and tube heat exchanger and then introducing a vinyl group into the polymer terminus in a tubular reactor.

Whereas, in the conventional batchwise polymerization process, it is necessary to perform a cycle of raw materials charging, reaction and discharging process repeatedly, it can be expected, in the continuous polymerization process, that the productivity will be improved and the heat of reaction will be removed more efficiently since the steady operation can be carried out.

However, there still remain some problems in employing the continuous polymerization process for improving the productivity. Thus, as a result of carrying out continuous polymerization using one stirring vessel reactor, an isobutylene polymer with a distribution of 1.4 to 1.8 was obtained in U.S. Pat. No. 4,568,732, in Nagy et al. (Polymer Bulletin, 13, pp. 97–102, 1985), a polymer with a distribution of 1.6 to 2.7 and in Nagy et al. (Polymer Bulletin, 14, pp. 251–257, 1985), a polymer with a distribution of 1.4 to 1.8 were obtained, and these distribution values are higher than those obtainable in the above-mentioned batchwise polymerization processes of Japanese Kokai Publication Hei-07-292038, Japanese Kokai Publication Hei-08-53514, etc. Such tendency is presumably subject to the influence of the fact that when the reaction is carried out in the continuous flow-through mode using one stirring vessel, the residence time of the reaction solution has a wide distribution (i.e. polymer molecules differ in the residence time in the vessel one another), hence molecular chains growing by living polymerization during different residence times hardly become uniform in length. For anionic living polymerization as well, attempts have been made to carry out the reaction in a continuous flow-through stirring vessel. Reportedly, the polymers obtained show a molecular weight distribution value of 1.8 to 2.6 and this is attributable to the residence time distribution in the stirring vessel (Japanese Kokai Publication Hei-05-339326).

In the continuous polymerization method of Majoros et al. (Polymer Bulletin, 31, pp. 255–261, 1993) in which three stirring vessels are used in series, the residence time distribution is presumed to be improved as narrowed to give polymers with a molecular weight distribution of 1.35 to 1.37. Thus, a tendency that the distribution becomes uniform is manifested as compared with the use of one stirring vessel. However, the uniformity in molecular weight is inferior as compared with the batchwise polymerization process. In Japanese Kokai Publication Hei-06-298843, a shell and tube heat exchanger is used as a reactor in continuous polymerization of isobutylene using a trifunctional initiator, with the result that the molecular weight distribution of the polymer obtained is as high as 3.1. In the polymerization using a tubular reactor reported by Nagy et al. (Polymer Bulletin, 15, pp. 411–416, 1986), the distribution is 1.5 to 2.8. In a report on anionic living polymerization (Japanese Kokai Publication Hei-11-286520), polymers with a molecular weight distribution of 1.3 to 1.8 are obtained using a flow-through tubular reactor and, although the molecular weight distribution is rather smaller as compared with cationic living polymerization, the uniformity is not yet satisfactory. It is considered that when these tubular reactors were used, the mixing just after feeding of the raw materials to the reactor was insufficient and, as a result, the reaction did not occur adequately but side reactions concurred.

According to the method of Japanese Kokai Publication Hei-06-298843, polymers are synthesized using a trifunctional initiator and a vinyl group is further introduced into a polymer terminus. While, in this case, theoretically, the number of terminal vinyl groups based on the initiator should be 3, the reported number of terminal vinyl groups is 6.14. A reason therefor is supposedly that vinyl group termini were generated by side reactions in addition to the polymers having 3 vinyl groups resulting from the reaction as expected.

As discussed above, when cationic living polymerization is carried out by the continuous flow-through process, the residence time distribution of the reaction solution becomes wide and non-initiator-derived polymers are formed by side reactions and, consequently, a problem arises that the distribution of the polymer obtained becomes high. For instance, among liquid polymer products, their viscosity become different according to the distribution value even their average molecular weight are the same. That polymers have the same number average molecular (Mn) but differ in distribution (Mw/Mn) means that they differ in weight average molecular weight (Mw). The viscosity of a polymer is determined by the value of Mw. As the distribution increases, the Mw increases and, in many cases, the viscosity of the polymer increases, making the polymer difficult to handle. Another problem is that side reactions occur and, as a result, the functional group introduction is not effected as designed. Originally, the same number of functional groups as that of active sites on the initiator should be introduced but, in actuality, some termini maybe inactivated thereby functional groups are not introduced, or active sites maybe generated by side reactions thereby the functional group introduction may not be effected as designed, in some cases. The functional groups introduced into a polymer are to be involved in a crosslinking or some other reactions and, therefore, if the functional group introduction is not effected as designed, it is impossible in many cases to obtain satisfactory products. Those are important problems characteristic of the continuous operation.

In view of the above-mentioned state of the art, it is an object of the present invention to provide a production method by which side reactions are inhibited and polymers with a low distribution can be obtained continuously with good efficiency.

Another object of the invention is to provide a production method of polymers using a compact apparatus enabling efficient control of the reactor inside temperature.

A further object of the invention is to provide a production method by which functional groups can be introduced into polymer termini as designed.

A still further object of the invention is to provide an efficient production method of block copolymers.

DISCLOSURE OF INVENTION

Thus, the invention consists in a method of producing a polymer
which comprises feeding a polymerization initiator, a cationically polymerizable monomer component and a catalyst continuously to a flow-through stirring vessel reactor to thereby allow the living polymerization to initiate and
feeding a reaction solution from said flow-through stirring vessel reactor to a flow-through tubular reactor continuously to thereby allow the living polymerization to proceed,
said reaction solution having a conversion rate of said cationically polymerizable monomer component of not less than 1% by weight to less than 90% by weight.

In a preferred embodiment of the invention, a functional group-terminated polymer is obtainable by adding an end capping agent to the reaction solution discharged from said flow-through tubular reactor to thereby allow the agent to react with a living polymer terminus.

In another preferred embodiment of the invention, a block copolymer is obtainable by adding a second cationically polymerizable monomer component other than said cationically polymerizable monomer component to the reaction solution discharged from said flow-through tubular reactor to thereby effect living copolymerization.

In the following, the present invention is described in detail.

As for the details of the cationic living polymerization to which the invention is applicable, the monograph of J. P. Kennedy et al. (Carbocationic Polymerization, John Wiley & Sons, 1982) and the monograph of K. Matyjaszewski et al. (Cationic Polymerizations, Marcel Dekker, 1996), for instance, contain summarized descriptions of the synthetic reactions.

(Polymerizable Monomers)

As the cationically polymerizable monomer to be used in the cationic living polymerization according to the invention, there may be olefins containing 3 to 12 carbon atoms, conjugated dienes, vinylethers, aromatic vinyl compounds (hereinafter also referred to as "styrenics") and the like. As specific examples, there may be mentioned, for example, isobutylene, propylene, 1-butene, 2-butene, 2-methyl-1-butene, 3-methyl-2-butene, pentene, 4-methyl-1-pentene, hexene, 5-ethylidenenorbornene, vinylcyclohexane, butadiene, isoprene, cyclopentadiene, methyl vinyl ether, ethyl vinyl ether, isobutyl vinyl ether, styrene, α-methylstyrene, p-methylstyrene, dimethylstyrene, monochlorostyrene, dichlorostyrene, β-pinene, indene and the like. Among these, isobutylene, propylene, 1-butene, 2-butene, styrene, p-methylstyrene, α-methylstyrene, indene, isoprene, cyclopentadiene and the like are preferred.

The cationically polymerizable monomer component to be used in the practice of the invention preferably contains isobutylene, among them, one containing not less than 50% by weight of isobutylene is preferred.

In the production method of the invention, these monomers may be used singly or two or more of them may be used in combination to carry out block copolymerization or random copolymerization. In cases where a block copolymer is produced by using two or more monomers, the monomer species which are to be main components of blocks may arbitrarily be selected from among the monomers mentioned above. Considering the performance characteristics of the product obtainable, it is preferred that the first cationically polymerizable monomer component contains isobutylene and the second cationically polymerizable monomer component contains astyrenic. In particular, the first monomer component containing not less than 50% by weight of isobutylene and the second monomer component containing not less than 50% by weight of a styrenic are preferably used.

(Polymerization Initiator)

As a method of carrying out the initiation reaction in cationic living polymerization efficiently, the so-called inifer method has been developed which uses, as a polymerization initiator, a compound having a chlorine atom linked to a tertiary carbon, a chlorine compound having an aromatic ring at the position a or like compounds (U.S. Pat. No. 4,276,394) and this method can be applied in the practice of the invention. The polymerization initiator to be used in the inifer method may be any one capable of fulfilling the desired function and includes, as typical examples, those having the following structure:

(X—CR$^1$R$^2$)$_n$R$^3$ in the formula, X represents a halogen atom, R$^1$ and R$^2$ are the same or different and each represents a univalent hydrocarbon group containing 1 to 20 carbon atoms, 3 represents a hydrocarbon group containing 1 to 20 carbon atoms and having a valence of n, and n is an integer of 1 to 4.

Those initiator species which can be used in the practice of the invention are described in Japanese Kokai Publication Hei-07-292038 and, as typical polymerization initiators, 1,4-bis(α-chloroisopropyl)benzene [hereinafter also referred to as p-DCC or dicumyl chloride] and 1,3,5-tris(α-chloroisopropyl)benzene (TCC) and derivatives thereof are preferred and these may be used singly or in admixture. Thus, aromatic ring-containing initiators are more preferred. These unifunctional, bifunctional and polyfunctional initiators can arbitrarily be used according to the structure of the polymer to be obtained, for example a unifunctional, bifunctional, polyfunctional, diblock, triblock or stellar block polymer. For controlling a molecular weight of a polymer, the ratio of the monomer weight per mole of the polymerization initiator is selected so that it nearly corresponds to the molecular weight of the polymer to be synthesized. For example, when 10,000 g of a monomer is used per mole of an initiator, the polymer may have a molecular weight of about 10,000. The number average molecular weight of the polymer produced by the method of the invention is not particularly restricted but, generally, it is 500 to 300,000, more preferably 3,000 to 150,000.

(Polymerization Catalyst)

A Lewis acid catalyst is used in the cationic living polymerization of the present invention. As specific examples thereof, there maybe mentioned TiCl$_4$, AlCl$_3$, BCl$_3$, ZnCl$_2$, SnCl$_4$, ethylaluminum chloride, SnBr$_4$ and the like. The amount of Lewis acid catalyst to be used may be a mole ratio of 0.0001 to 10 based on the amount of monomer or in a mole ratio of 0.1 to 1,000 based on the initiator.

(Electron Donor)

As an additional measure for improvement in carrying out the cationic living polymerization, the use of an electron donor for inhibiting side reactions such as the chain transfer reaction and proton initiation reaction and obtaining good polymers has been reported (Japanese Kokai Publication Hei-02-245004, Japanese Kokai Publication Hei-01-318014, Japanese Kokai Publication Hei-03-174403). The use of an electron donor is preferred in the practice of the invention. Example thereof are pyridines, amines, amides, sulfoxides, esters, metal compounds having an oxygen atom linked to the metal atom and the like. Specifically, use may be made of pyridine, 2-methylpyridine (referred to as picoline or α-picoline for short), trimethylamine, dimethylacetamide (DMAc for short), dimethylformamide (DMSO), ethylacetate (EtOAc), Ti(O-iPr)$_4$and so forth.

The preferred range of the amount of the electron donor to be used in the practice of the invention is not always the same as in the conventional batchwise cationic living polymerization operation. In the practice of the invention, the electron donor is caused to occur in the reaction system preferably in a mole ratio of 0.10 to 5 relative to the Lewis acid catalyst or in the concentration in the reaction solution of 6 to 500 mol/m$^3$. In the conventional continuous cationic living polymerization operations, the electron donor amounts reported are much smaller than the levels found to be appropriate in the present invention or any electron donor is not used at all.

When the amount of the electron donor is too small, the tendency toward side reactions increases and problems occur, for example the distribution increases due to the occurrence of side reactions such as the proton initiation reaction and chain transfer reaction and/or the functional group introduction into polymer termini is not carried out as designed. Conversely when the amount of the electron donor is excessive, the cationic polymerization reaction is markedly reduced and the productivity is lowered thereby. Therefore, a more preferred amount of the electron donor is in a molar ratio of 0.15 to 1 relative to the Lewis acid catalyst or within the range such that the concentration in the reaction solution of 10 to 50 mol/m$^3$.

(End Capping Agent)

According to the invention, it is possible to introduce an allyl, hydroxyl, allyl phenyl ether, phenol or like group into the termini by using an end capping agent following the polymerization reaction. For example, phenol groups are introduced by the Friedel-Craft reaction in Japanese Kokai Publication Hei-04-20501, allyl groups are introduced by the substitution reaction with allyltrimethylsilane in Japanese Kokai Publication Hei-02-248406, and alkenyl groups are introduced by the addition reaction of a nonconjugated diene in Japanese Kokai Publication Hei-04-288308 and Japanese Kokai Publication Hei-04-288309. The allyl group-terminated isobutylene polymer described in Japanese Kokai Publication Hei-02-248406 can be converted to a rubbery curing product by the so-called addition type curing using a SiH group-containing curing agent. Further, as described in Japanese Kokai Publication Hei-09-208624, silyl group-terminated isobutylene polymer obtained by hydrosilylation of allyl groups at polymer termini gives a rubbery curing product upon silanol condensation in the presence of water.

Preferred as the end capping agent to be used in the practice of the invention are nonconjugated dienes, vinylsilanes, allylsilanes and the like.

As the nonconjugated dienes to be used in the practice of the invention, those known in the art can be widely used. Mention may be made, for example, of 1,4-pentadiene, 1,5-hexadiene, 1,6-heptadiene, 1,7-octadiene, 1,8-nonadiene, 1,9-decadiene, 1,19-dodecadiene, 2-methyl-2,7-octadiene, 2,6-dimethyl-1,5-heptadiene and 1,5,9-decatriene, etc. Among these, 1,4-pentadiene, 1,5-hexadiene, 1,6-heptadiene, 1,7-octadiene, 1,8-nonadiene, 1,9-decadiene, 1,19-dodecadiene and like α,ω-dienes are preferred from the resulting polymer activity viewpoint.

As the vinylsilanes and allylsilanes to be used in the practice of the invention, those known in the art can be used widely. As specific examples, there may be mentioned, for example, vinyltrichlorosilane, vinylmethyldichlorosilane, vinyldimethylmethoxysilane, vinyltrimethylsilane, divinyldichlorosilane, divinyldimethylsilane, 1,3-divinyl-1, 1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, allyldichlorosilane, diallyldimethoxysilane, diallyldimethylsilane, γ-methacryloyloxypropyltrimethoxysilane, γ-methacryloyloxypropylmethyldimethoxysilane and the like.

Also preferred as the end capping agent are following compounds having a protected hydroxyl group and a carbon-carbon double bond:

$CH_2=C(R^4)-B-OG$ in the formula, $R^4$ represents a hydrogen or a saturated hydrocarbon group containing 1 to 18 carbon atoms, B represents a divalent hydrocarbon group containing 1 to 30 carbon atoms and G represents a univalent substituent. The isobutylene polymer obtained by this method and terminally having a protected hydroxyl group can be easily transformed to the corresponding isobutylene polymer terminally having a hydroxy group by deprotection.

Substituted phenols having a univalent alkyl group at the position 2 or 6 are also preferred as the end capping agent.

As the end capping agent, one species may be used singly or two or more species may be used in combination.

In the practice of the invention, the amount of use of the end capping agent (in particular a nonconjugated diene or allyltrimethylsilane) is generally in an amount of 0.01 to 200 moles, preferably 0.1 to 100 moles, more preferably 0.5 to 10 moles, per mole of the living polymer or polymerization initiator. Further, allyltrimethylsilane is preferred because of its high reactivity with polymer termini.

(Reaction Temperature)

The reaction temperature of the cationic living polymerization according to the invention is within the range of −100 to 0° C. Under relatively high temperature conditions, the rate of reaction is slow and side reactions such as the chain transfer reaction may occur. Therefore, a temperature lower than −30° C. is more preferably selected. When, however, the reaction temperature is below −100° C., the substances to be involved in the reaction (raw materials or polymer) may precipitate out. Thus, a more preferred reaction temperature is −80 to −30° C.

(Reaction Solvent)

In the practice of the invention, the cationic living polymerization may be carried out in a reaction solvent. For example, a single solvent selected from the group consisting of halogenated hydrocarbons, aliphatic hydrocarbons and aromatic hydrocarbons, or a mixed solvent thereof may be used (Japanese Kokai Publication Hei-08-53514).

Useful as the halogenated hydrocarbons are chloroform, methylene chloride, 1,1-dichloroethane, 1,2-dichloroethane, n-propyl chloride, n-butyl chloride, 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane, 2-chlorooctane, chlorobenzene and the like. The solvent may be a single species selected from among these or may be composed of two or more species selected from among them.

Preferred as the aliphatic hydrocarbons are butane, pentane, neopentane, hexane, heptane, octane, cyclohexane, methylcyclohexane and ethylcyclohexane. The solvent may be a single species selected from among these or may be composed of two or more species selected from among them.

Preferred as the aromatic hydrocarbons are benzene, toluene, xylene and ethylbenzene. The solvent may be a single species selected from among these or may be composed of two or more species selected from among them.

A mixed solvent of a halogenated hydrocarbon and an aliphatic hydrocarbon or a mixed solvent of an aromatic hydrocarbon and an aliphatic hydrocarbon is more preferably used from the viewpoint of reaction control and solubility.

When, for example, a mixture of toluene and an aliphatic hydrocarbon is used as the solvent, the content of toluene in the mixed solvent is not particularly restricted but generally within the range of 10 to 100% by weight, more preferably within the range of 50 to 100% by weight.

In a mode of practice of the invention in which a reaction solvent is used, it is preferable, considering the solubility of the polymer obtainable, the viscosity of the solution, and the ease of heat removal, to use the solvent such that a polymer concentration is 5 to 80% by weight. From the productivity and operability viewpoint, it is advantageous to use in an amount to 10 to 60% by weight.

(Operation of Reaction Apparatus)

According to the invention, the living polymerization is initiated by feeding the polymerization initiator, cationically polymerizable monomer component and catalyst continuously to a flow-through stirring vessel reactor and the reaction solution with a conversion rate of the above cationically polymerizable monomer component of not less than 1% by weight to less than 90% by weight is continuously fed from the above flow-through stirring vessel reactor to a flow-through tubular reactor for further allowing the living polymerization to proceed to give a polymer. By first effecting sufficient mixing with stirring in the stirring vessel reactor, it becomes possible to introduce the mixture made uniform in the concentrations of the monomer, initiator, catalyst and so on into the flow-through tubular reactor. If the polymerization conversion rate of the polymerizable monomer component in the flow-through stirring vessel, which is the first reactor, becomes excessive, the molecular weight distribution will become wide. Therefore, it is more preferred to feed that reaction solution at the stage of a conversion rate of 5 to 50% by weight to the flow-through tubular reactor. If the conversion rate in the first reactor is excessively high, the monomer concentration in the stirring vessel reactor tends to lower to thereby effect side reactions. It is therefore effective to control the conversion rate in the first reactor.

Among the components to be fed to the reactor, the monomer and initiator, which react when mixed with the catalyst, are preferably fed separately from the catalyst to the first reactor for mixing. Thus, preferably, (1) a raw material solution containing the cationically polymerizable monomer component and the polymerization initiator and (2) a raw material solution containing the catalyst are respectively fed continuously to the flow-through stirring vessel reactor and both the raw material solutions are mixed in that reactor to thereby initiate the living polymerization. When an electron donor is used, a long time of mixing thereof with the catalyst or with the initiator may cause a chemical change thereof and, therefore, it is preferred to feed the same separately from such catalyst or initiator and mix them in the reactor.

While, according to the invention, the polymerizable monomer is fed to the first reactor, portions thereof may be fed to the second reactor and/or the subsequent reactors. In particular when copolymerization is carried out, a first monomer component is fed to the first reactor and, after the progress of the polymerization, a second monomer component may be added in the third and subsequent reactors. For example, when a bifunctional initiator and isobutylene are fed to the first flow-through stirring vessel reactor to initiate the polymerization, then the polymerization of isobutylene is completed in the second flow-through tubular reactor and thereafter a styrenic is added to the third reactor, the styrenic is then polymerized starting from both termini of polyisobutylene grown linearly in two directions, whereby a triblock copolymer can be synthesized.

When an end capping agent is reacted with polymer termini, the end capping agent can be fed to the third and/or subsequent reactors. Upon introduction of the end capping agent, the growth of polymer termini by cationic polymerization stops. It is therefore preferred to add the end capping agent after substantial completion of the polymerization reaction.

(Flow-through Stirring Vessel Reactor)

In accordance with the invention, a stirring vessel type is used as the first reactor. The structure thereof is not particularly restricted but is preferred which is capable of being cooled by means of a jacket, for instance, and capable of uniformly mixing and reacting the polymerization initiator, Lewis acid catalyst and monomer fed continuously. The structure may be such that an incidental device such as an inside coiled condenser or reflux condenser is provided for improving the cooling efficiency or a baffle plate is provided for improving the degree of mixing. In cases where a plurality of stirring vessel reactors are used, they may be of the same type or different in type.

The agitator blade to be used in the stirring vessel reactor is not particularly restricted but preferably is one giving a high performance in up and down circulation and mixing of the reaction solution. Thus, suited for use are (multistage) pitched paddle blades, turbine blades and like agitator blades when the viscosity of the polymerization/reaction solution is relatively in a low viscosity range such as several centipoises; Max blending blades, full zone blades, Sammeler blades, Hi-F mixer blades and large-sized blades having a large bottom paddle as described in Japanese Kokai Publication H10-24230 for a medium viscosity range of scores of centipoises to several hundred poises; and anchor blades, (double) helical ribbon blades and Logborn blades, for a high viscosity range exceeding several hundred poises.

(Flow-through Tubular Reactor)

In accordance with the invention, the reaction solution discharged from the first flow-through stirring vessel reactor is led to a flow-through tubular reactor for continued polymerization reaction. The structure of the tubular reactor is not particularly restricted but one having the ability to remove heat is preferred. Thus, for example, a double tubular type or shell and tube type can suitably be used. For improving the mixing and heat-removing capacity, it is also possible to use a tubular reactor with one or more static mixing structures comprising a number of mixing elements incorporated therein. As the static mixing structure, there may be mentioned, for example, well-known static mixers, such as of the Sulzer, Koenigs, Toray or Noritake Company type, and the like. The number of mixing element is preferably not less than 3. It is preferred for the tubular reactor to be used in the practice of the invention to have good mixing property in the radial direction of the tube, which is suited for heat transfer and for mixing of the components fed, and have no propensity to cause a reaction solution residence time distribution in the lengthwise direction of the tube.

(Heat Exchanger)

Since the polymerization procedure is carried out in a continuous flow-through mode in the cationic living polymerization according to the invention, the feeding of respective raw materials to the reactor and the discharge of the reaction solution can be conducted continuously at a constant flow rate. Therefore, in the practice of the invention, it is preferred to recover the sensible heat of the reaction solution to reduce the energy load by subjecting the reaction solution continuously discharged from the reactor to heat exchange with at least one of the raw material solutions to be fed to the reactor. In particular, the cationic living polymerization proceeds in many instances at low temperatures within the range of −30° C. to −100° C., so that the load on the refrigerating machine for cooling the raw material solutions is great. Therefore, by utilizing the low-temperature reaction solution discharged from the reactor for cooling the raw material solution via a heat exchanger, efficient production is made possible. The heat exchanger which can be used is not particularly restricted but, for example, the double tubular, shell and tube, plate, spiral and other types may be used. By applying the so-called countercurrent heat exchange process which comprises causing heat exchange between the low-temperature reaction solution flowing through the heat exchanger with the temperature thereof gradually rising and the raw material solution before cooling and leading the same gradually to the low-temperature side, it is possible to cool the raw material solution to a temperature level close to the low-temperature reaction solution.

(Explanation Referring to the Drawings)

In the following, typical modes of practice of the invention are described referring to the examples illustrated. The examples shown, however, are by no means limitative of the scope of the invention.

Figure 1:
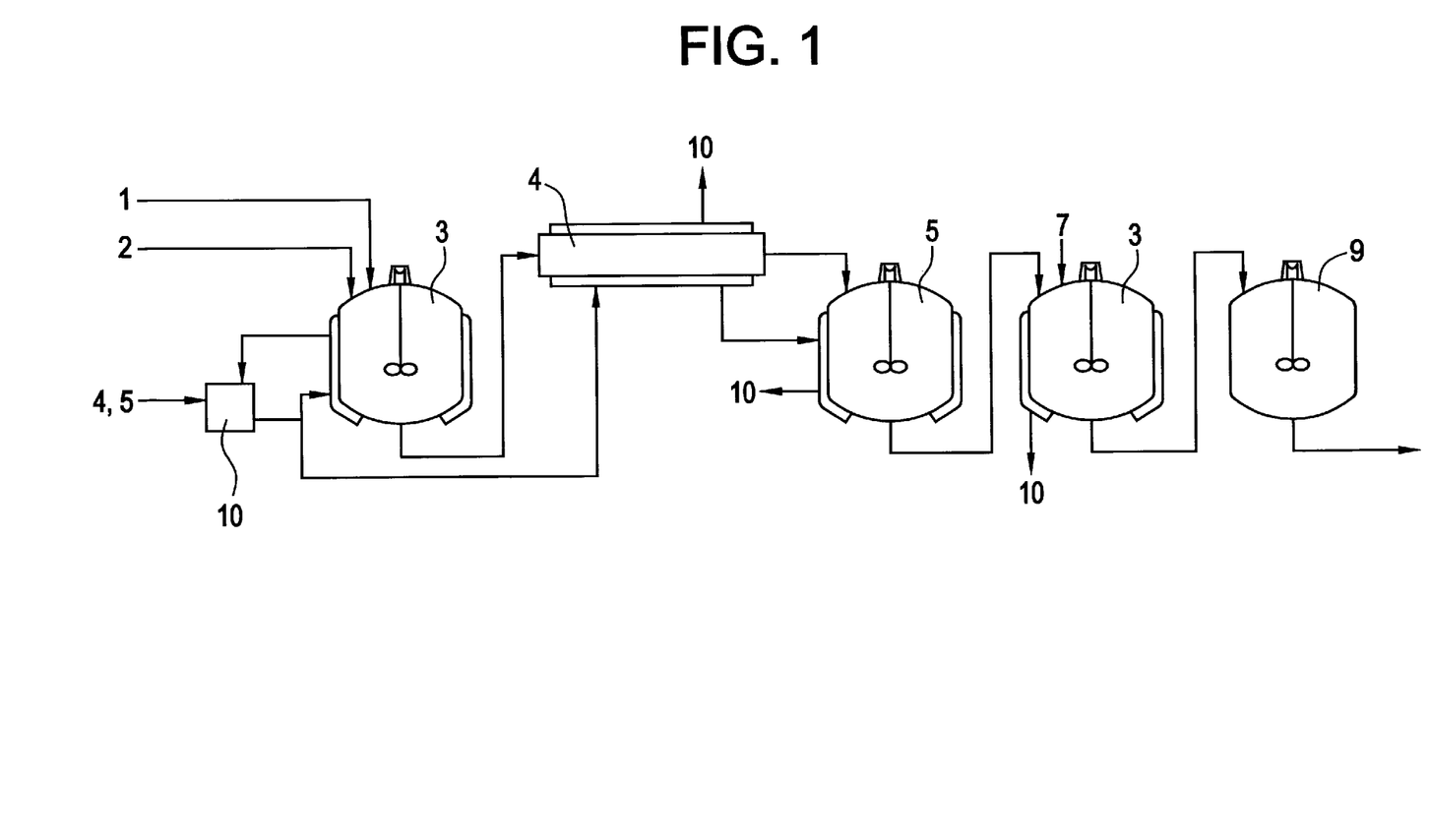
FIG. 1 shows a schematic representation of a continuous polymerization system 1.

FIG. 1 schematically shows a reaction system for carrying out the living polymerization of a polymerizable monomer continuously in a stirring vessel reactor 3, then carrying out the continuous polymerization in a tubular reactor 4, causing the reaction solution once to reside in a cushioning vessel 5, then reacting the same with an end capping agent in a stirring vessel reactor 3 batchwise and transferring the reaction solution to a receptacle 9. In this method, the polymerizable monomer is polymerized in a continuous manner and the functional group modification using the end capping agent is carried out batchwise reaction.

Figure 2:
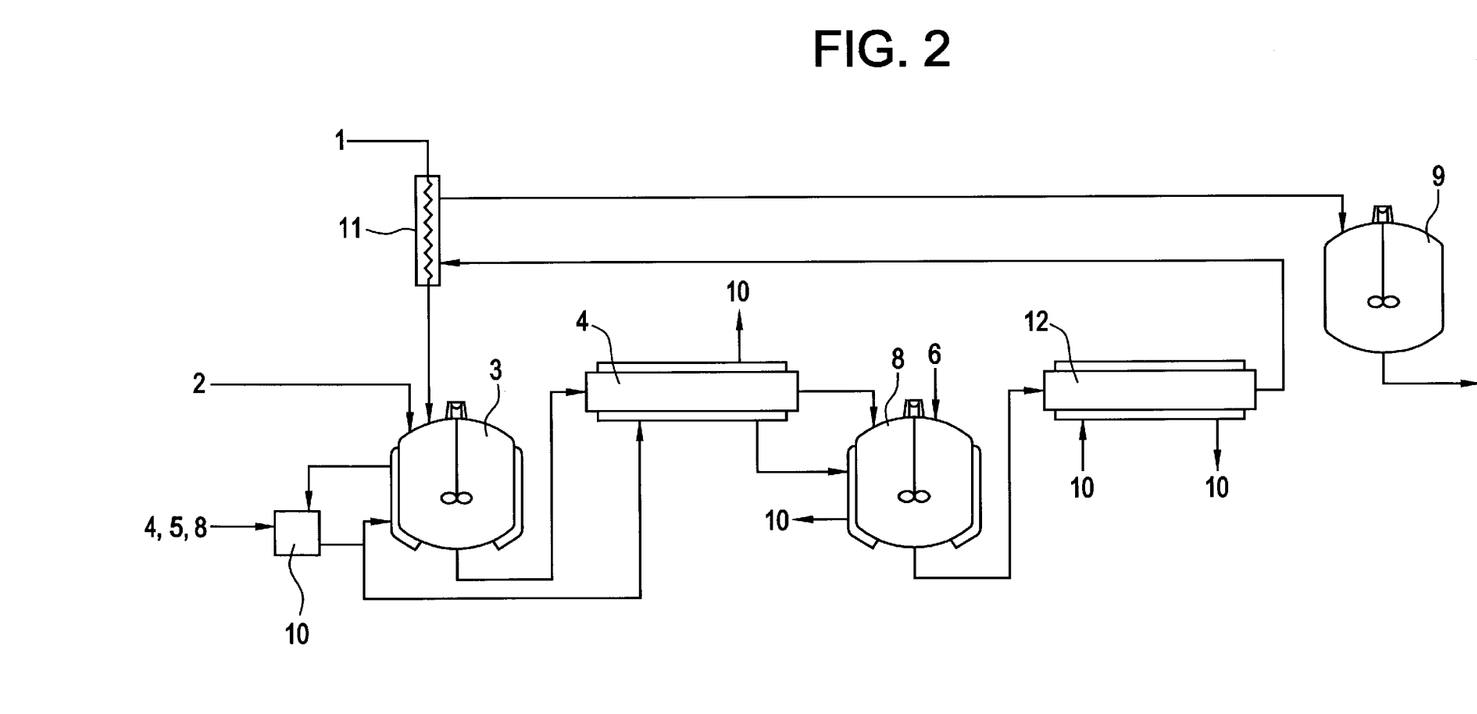
FIG. 2 shows a schematic representation of a continuous polymerization system 2.

FIG. 2 schematically shows a reaction system for carrying out the living polymerization of a polymerizable monomer continuously in a stirring vessel reactor 3, then carrying out the continuous polymerization in a tubular reactor 4, reacting in succession a second polymerizable monomer continuously in a stirring vessel reactor or tubular reactor 8, allowing the reaction to proceed in succession in a stirring vessel reactor or tubular reactor 12 continuously and, prior to transferring the reaction solution to a receptacle 9, recovering the sensible heat by heat exchange with the raw material 1 in a heat exchanger 11. In this method, the first polymerizable monomer is continuously polymerized and the second polymerizable monomer is also copolymerized in the manner of continuous reaction.

EXPLANATION OF SYMBOLS

1—Feeding line for a raw material containing a cationically polymerizable monomer component and a polymerization initiator
2—Feeding line for an auxiliary raw material containing a catalyst
3—Stirring vessel reactor
4—Tubular reactor
5—Cushioning vessel
6—Feeding line for a raw material containing a second cationically polymerizable monomer component
7—Feeding line for a raw material containing an end capping agent
8—Tubular reactor or stirring vessel reactor
9—Receptacle
10—Brine refrigerator line
11—Heat exchanger
12—Tubular reactor or stirring vessel reactor
21—Storage tank 1
22—Storage tank 2
23—Feeding pump 1
24—Feeding pump 2
25—Stirring vessel reactor
26—Tubular reactor
27—Deactivation tank
28—Cushioning tank
29—Refrigerator brine line
30—Cushioning vessel
31—Feeding line for a raw material containing an end capping agent
32—Feeding line for a raw material containing a second cationically polymerizable monomer component
33—Storage tank 3
34—Feeding pump 3
35—Stirring vessel reactor

BEST MODES FOR CARRYING OUT THE INVENTION (Analytical Methods)

In the practice of the invention, the number average molecular weight (Mn) and distribution (Mw/Mn) of the isobutylene polymer are determined by gel permeation chromatography (GPC) using chloroform as the mobile phase, together with polystyrene gel columns. The value of Fn (vinyl) [average number of vinyl groups occurring in one isobutylene polymer molecule] is determined by measuring the resonance signals for the protons assignable to the respective structures by $^1$H-NMR (300 MHz) and comparing the data.

EXAMPLE 1

Figure 3:
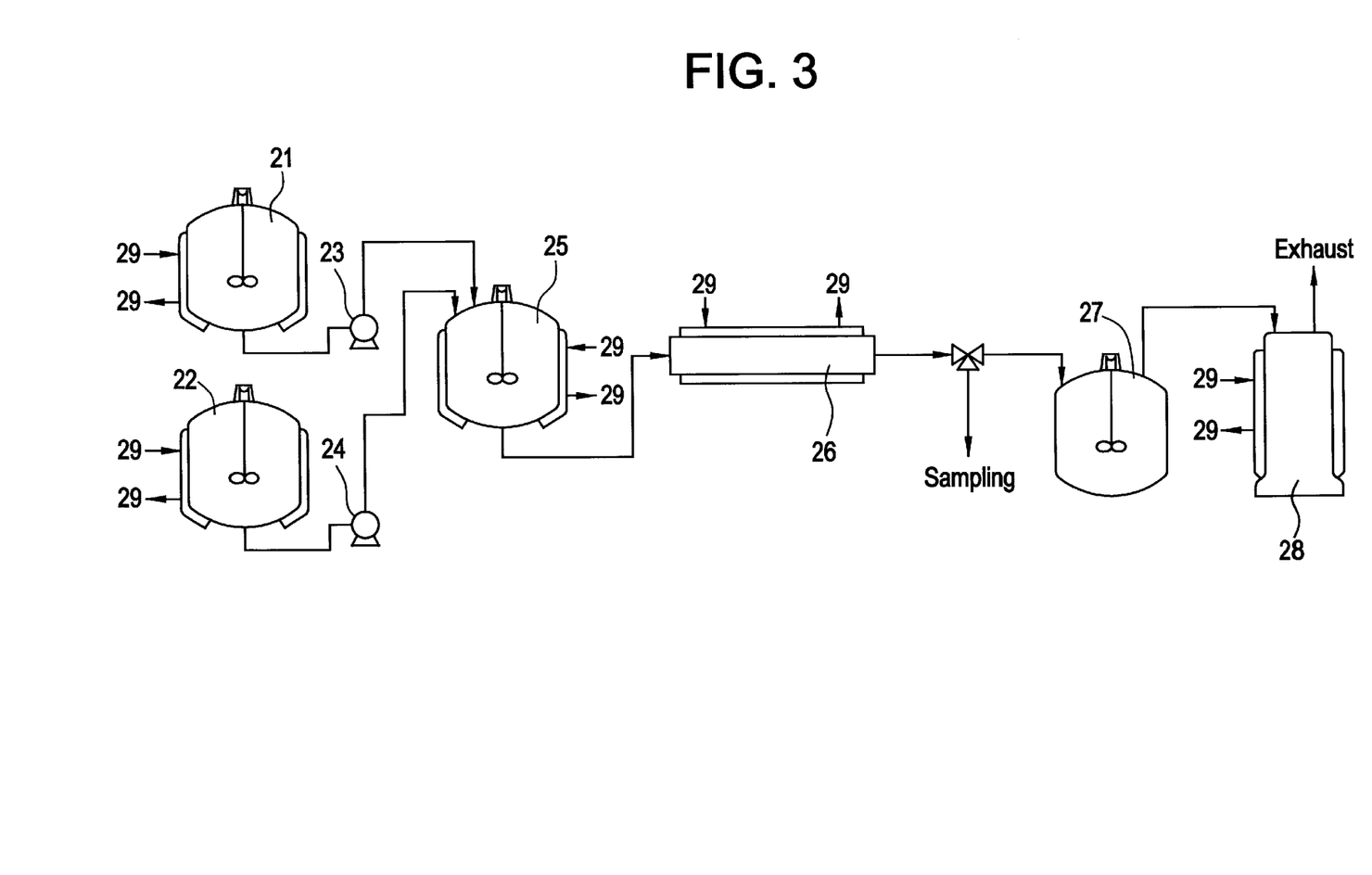
FIG. 3 shows an experimental apparatus used in Examples 3 and 5 and Comparative Examples 1, 2, 3 and 4.

The experimental apparatus used in Examples 1, 3 and 5 and Comparative Examples 1, 2, 3 and 4 is shown in FIG. 3.

A storage tank 21 (capacity 2,500 ml), a storage tank 22 (capacity 2,500 ml) and a stirring vessel reactor 25 (capacity 1,200 ml, large-sized paddle blade, d/D=0.5, 3 baffle plates) and a tubular reactor 26 (capacity 2,000 ml, inside diameter 10 mm) were purged with nitrogen and the storage tanks 21 and 22 and the reactors 25 and 26 were then charged with toluene and ethylcyclohexane in a volume ratio of about 3:1.

Brine was fed to the jacket portion each of the storage tanks 21 and 22 and the reactors 25 and 26 from a refrigerator line 29 to thereby adjust the storage tank and reactor inside temperatures each to −65° C., and the storage tank 21 was charged with a polymerizable monomer and a polymerization initiator and the storage tank 22 with a catalyst and an electron donor. Isobutylene was used as the polymerizable monomer, 1,4-bis(α-chloroisopropyl)benzene (p-DCC) as the polymerization initiator, TiCl$_4$ as the catalyst and α-picoline as the electron donor, and these were charged in the respective proportions shown in Table 1. With these proportions, the mole ratio of α-picoline to the Lewis acid catalyst was 0.16 and the concentration of α-picoline in the reaction solution was 10 mol/m$^3$.

After arrival of the inside temperature in each of the storage tanks 21 and 22 and the reactors 25 and 26 at −65° C., the feeding of the respective raw materials to the reactor 25 was started in the amounts shown in Table 1 by means of pumps 23 and 24. The sample at the outlet of the reactor 26 was mixed with water for catalyst deactivation and washed with water and solvent was removed to give a polymer.

The percent yield was calculated based on the weight yield of the polymer obtained, and the number average molecular weight (Mn) and molecular weight distribution (Mw/Mn) were determined by the GPC method. The analytical values for the polymer at the outlet of the reactor 26 (150 minutes after the start of the feeding) and the difference between the reaction solution temperature in the reactor 25 and the jacket temperature were as shown in Table 2. The conversion rate of the monomer component on the occasion of feeding the reaction solution from the reactor to the reactor 26 was 70% by weight.

TABLE 1

| | Main/auxiliary raw materials | Amount charged | Amount fed |
|---|---|---|---|
| Storage tank 21 | Toluene | 780 ml | 13 ml/min |
| | Ethylcyclohexane | 260 ml | |
| | Isobutylene | 1460 ml | |
| | p-DCC | 16.2 g | |
| Storage tank 22 | Toluene | 1850 ml | 13 ml/min |
| | Ethylcyclohexane | 620 ml | |
| | α-Picoline | 5.0 ml | |
| | TiCl$_4$ | 35 ml | |

TABLE 2

| | Number average molecular weight (Mn) | Distribution (Mw/Mn) | Inside temp. [° C.] | Temperature difference [° C.] |
|---|---|---|---|---|
| Example 1 | 14900 | 1.34 | −60 | 5 |

Comparative Example 1

An experiment was carried out according to the same procedure as in Example 1 except that the reactor 26 shown in FIG. 3 was removed. The analytical values for the polymer at the outlet of the reactor 25 (150 minutes after the start of the feeding) and the difference between the reaction solution temperature in the reactor and the jacket temperature were as shown in Table 3.

TABLE 3

| | Number average molecular weight (Mn) | Distribution (Mw/Mn) | Inside temp. [° C.] | Temperature difference [° C.] |
|---|---|---|---|---|
| Compar. Example 1 | 11000 | 1.50 | −60 | 5 |

As is clear from the results of Example 1 and Comparative Example 1, the distribution was 1.50 in Comparative Example 1 whereas the distribution was smaller, namely 1.34, in Example 1.

EXAMPLE 2

Figure 4:
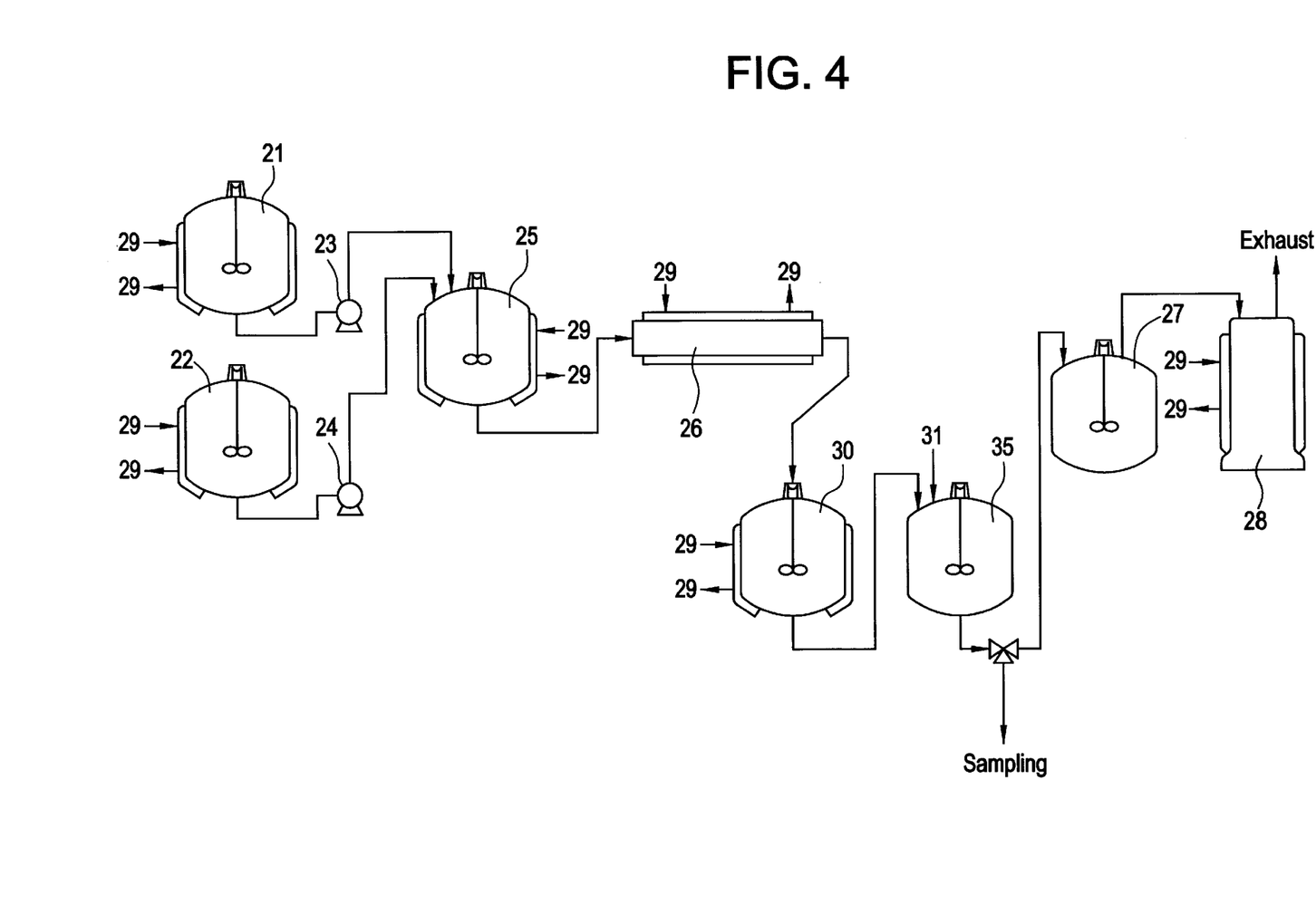
FIG. 4 shows an experimental apparatus used in Examples 2 and 4.

The experimental apparatus used in Examples 2 and 4 is shown in FIG. 4.

The reaction solution at the outlet of the tubular reactor 26 as obtained by the same procedure as in Example 1 was once allowed to reside in a cushioning vessel 30 and, then in the stirring vessel reactor 35, reacted with allyltrimethylsilane, an end capping agent, added in an amount of 3 moles per mole of p-DCC, batchwise at a temperature of −65° C. for 2 hours. The reaction solution was mixed with water for catalyst deactivation and washed with water and the solvent was then removed to give an allyl-terminated isobutylene polymer. The terminal structure was determined by measuring the resonance signals for the protons assignable to the respective structures by $^1$H-NMR (300 MHz) and comparing the data. The analytical data for the polymer obtained were as shown in Table 4. The conversion rate of the monomer component on the occasion of feeding the reaction solution from the reactor 25 to the reactor 26 was 70% by weight.

TABLE 4

| | Number average molecular weight (Mn) | Distribution (Mw/Mn) | Fn* (vinyl) |
|---|---|---|---|
| Example 2 | 15000 | 1.34 | 1.94 |

Fn* (vinyl) means the number of vinyl groups contained in one molecule.

As is evident from the results of Example 2, the reaction of the reaction solution discharged from the continuous reactor with the end capping agent allyltrimethylsilane gave a Fn* (vinyl) value of 1.94 and thus the allyl group introduction into active termini of the polymer after living polymerization could be realized as designed.

EXAMPLE 3

An experiment was carried out according to the same procedure as in Example 1 except that the amount of (α-picoline was 6.3 ml. The difference between the reaction solution temperature in the reactor 25 and the jacket temperature and the analytical data for the polymer at the reactor outlet were as shown in Table 5. The conversion rate of the monomer component on the occasion of feeding the reaction solution from the reactor 25 to the reactor 26 was 50% by weight.

TABLE 5

| | Number average molecular weight (Mn) | Distribution (Mw/Mn) | Inside temp. [° C.] | Temperature difference [° C.] |
|---|---|---|---|---|
| Example 3 | 15200 | 1.19 | −60 | 3 |

Comparative Example 2

An experiment was carried out according to the same procedure as in Comparative Example 1 except that the amount of α-picoline was 5.63 ml. In this proportion, the mole ratio of α-picoline to the Lewis acid catalyst was 0.2 and the concentration of α-picoline in the reaction solution was 13 mol/m³. The reactor inside temperature after arrival at a steady state (150 minutes after the start of the feeding) and the difference from the jacket temperature and the analytical values for the polymer at the reactor outlet were as shown in Table 6.

TABLE 6

| | Number average molecular weight (Mn) | Distribution (Mw/Mn) | Inside temp. [° C.] | Temperature difference [° C.] |
|---|---|---|---|---|
| Compar. Example 2 | 8200 | 1.46 | −60 | 3 |

As is evident from the results of Example 3 and Comparative Example 2, the distribution was 1.46 in Comparative Example 2 whereas the distribution in Example 3 was as narrow as 1.19.

EXAMPLE 4

The reaction solution (500 ml) obtained at the outlet of the tubular 26 in Example 3 was transferred to a stirring vessel reactor and the reaction thereof with allyltrimethylsilane added in an amount of 3.0 equivalents per mole of p-DCC was continued at a temperature of −65° C. for 2 hours. The reaction solution after introduction of allyltrimethylsilane was admixed with water for deactivation and washed with water and the solvent was then removed to give an allyl-terminated polyisobutylene polymer. The analytical values for the polymer obtained were as shown in Table 7.

TABLE 7

| | Number average molecular weight (Mn) | Distribution (Mw/Mn) | Yield [%] | Fn* (vinyl) |
|---|---|---|---|---|
| Example 4 | 15300 | 1.19 | >98 | 1.88 |

As is evident from Table 4, the reaction of the reaction solution discharged from the continuous reactor with the end capping agent allyltrimethylsilane gave an Fn* (vinyl) value of 1.88 and thus the allyl group introduction into active termini of the polymer after living polymerization could be accomplished as designed.

Comparative Example 3

Batchwise polymerization was carried out using the polymerizer 25 used in the practice of the present invention and according to the formulation shown in Table 8. The inside temperature at the time of catalyst charging was −65° C.

TABLE 8

| Main/auxiliary raw material | Amount charged |
|---|---|
| Toluene | 697 ml |
| Ethylcyclohexane | 174 ml |
| Isobutylene | 365 ml |
| p-DCC | 4.1 g |
| α-Picoline | 0.63 ml |
| TiCl$_4$ | 9.1 ml |

After carrying out the polymerization reaction for 2 hours, allyltrimethylsilane was added in an amount of 3 moles per mole of p-DCC and the reaction was allowed to proceed for 2 hours. The reaction solution was admixed with water for catalyst inactivation and washed with water and the solvent was then removed to give allyl-terminated polyisobutylene. The analytical values for the polymer obtained are shown in Table 9.

TABLE 9

| | Number average molecular weight (Mn) | Distribution (Mw/Mn) | Yield [%] | Fn* (vinyl) | Temperature difference [° C.] |
|---|---|---|---|---|---|
| Compar. Ex. 3 | 15600 | 1.17 | >99 | 1.92 | 10 |

As Examples 3 and 4 and Comparative Example 3 thus indicate, it was established that the distribution, Fn* (vinyl) and yield values showing no great differences from those obtainable by batchwise polymerization can be obtained by the method of the invention. In addition, while the reaction temperature rose by 10° C. in the batchwise polymerization in Comparative Example 3, the temperature rise was 3° C. and thus controlled in the continuous polymerization in Example 3.

EXAMPLE 5

The procedure of Example 3 was followed in the same manner except that the feeding amounts from the stirring vessel reactor 25 (capacity 300 ml, large-sized paddle blade, d/D=0.5, 3 baffle plates), tubular reactor 26 (capacity 1,000 ml, inside diameter 10 mm), storage tank 1 and storage tank 2 were each adjusted to 5 ml/min. The analytical values for the polymer at the outlet of the reactor 26 (150 minutes after the start of the feeding) and the difference between the reaction solution temperature in the reactor 25 and the jacket temperature were as shown in Table 10. The conversion rate of the monomer component on the occasion of feeding the reaction solution from the reactor 25 to the reactor 26 was 40% by weight.

TABLE 10

| | Number average molecular weight (Mn) | Distribution (Mw/Mn) | Inside temp. [° C.] | Temperature difference [° C.] |
|---|---|---|---|---|
| Ex. 5 | 13000 | 1.24 | −60 | 3 |

Comparative Example 4

An experiment was carried out according to the same procedure as in Example 5 except that the reactor 26 in FIG. 1 was removed. The analytical values for the polymer at the outlet of the reactor 25 (150 minutes after the start of the feeding) were as shown in Table 11.

TABLE 11

| | Number average molecular weight (Mn) | Distribution (Mw/Mn) | Inside temp. [° C.] | Temperature difference [° C.] |
|---|---|---|---|---|
| Compar. Ex. 4 | 4700 | 1.74 | −60 | 3 |

As is evident from the results of Example 5 and Comparative Example 4, the distribution was 1.74 in Comparative Example 4, while the distribution was as narrowed as 1.24 in Example 5.

EXAMPLE 6

Figure 5:
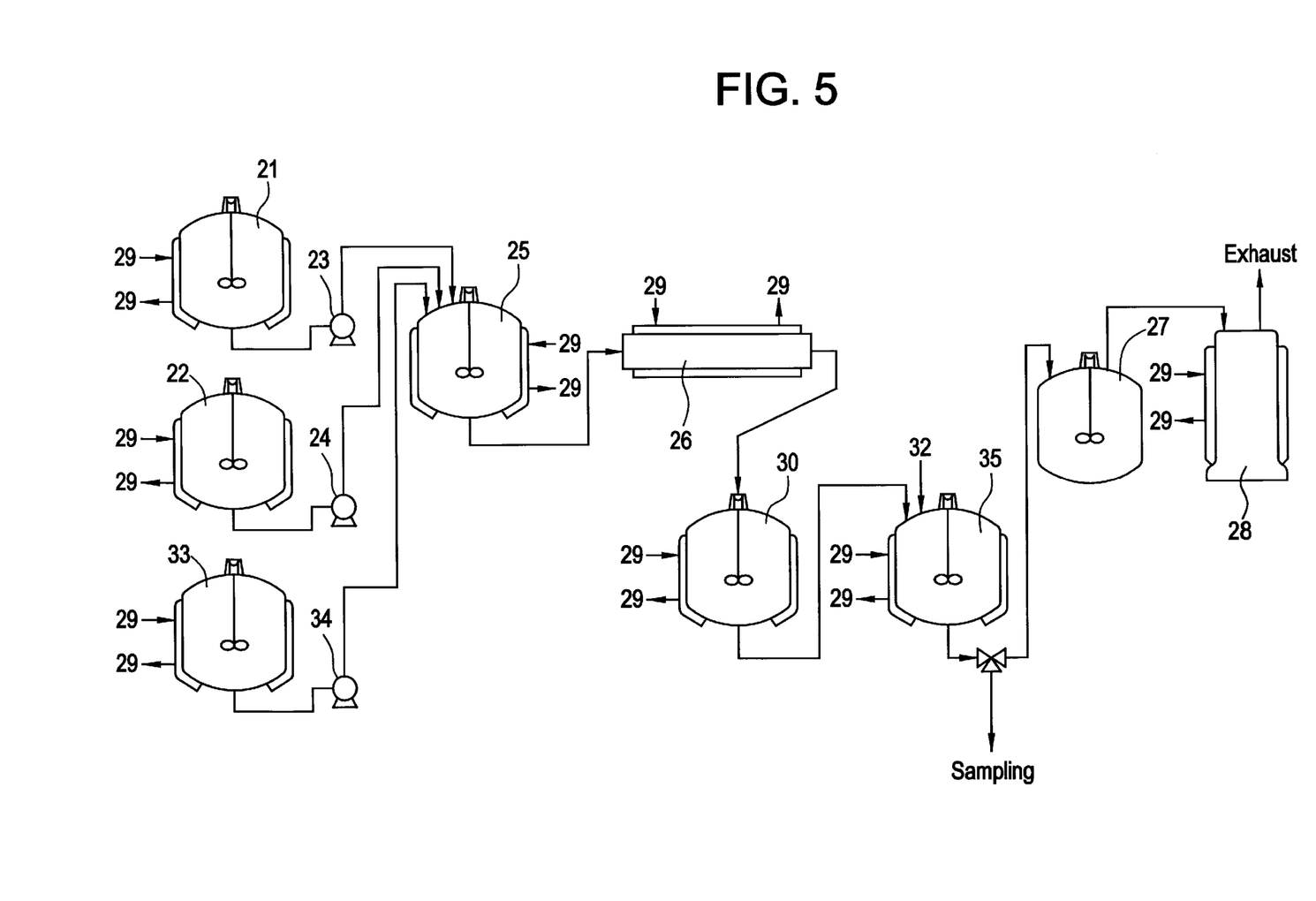
FIG. 5 shows an experimental apparatus used in Examples 6 and 7.

The experimental apparatus used in Examples 6 and 7 is shown in FIG. 5.

The polymerizable monomer component and polymerization initiator were charged into the storage tank 21, the catalyst was charged into the storage 22, and the electron donor was charged into the storage tank 33, in the respective proportions shown in Table 12. The reaction solution obtained at the outlet of the tubular reactor 26 in the same manner as in Example 1 was once allowed to reside in the cushioning vessel 30, then in the stirring vessel reactor 35, the second polymerizable monomer component styrene was added in an amount of 290 moles per mole of p-DCC and the reaction was carried out batchwise at −65° C. for 3 hours. The reaction solution was admixed with water for catalyst deactivation and washed with water and then the solvent was removed to give an isobutylene-styrene block copolymer. The molecular weight distribution peak (Mp) and distribution (Mw/Mn) of the polymer were determined by the GPC method. The analytical values for the polymer at the outlet of the reactor 26 (150 minutes after the start of the feeding) and the analytical values for the polymer at the outlet of the reactor 35 were as shown in Table 13. The conversion rate of the monomer component on the occasion of feeding the reaction solution from the reactor 25 to the reactor 26 was 65% by weight.

TABLE 12

| | Main/auxiliary raw materials | Amount charged | Amount fed |
|---|---|---|---|
| Storage tank 21 | Butyl chloride | 957 ml | 13 ml/min |
| | Methylcyclohexane | 920 ml | |
| | Isobutylene | 623 ml | |
| | p-DCC | 1.602 g | |
| Storage tank 22 | Butyl chloride | 1256 ml | 13 ml/min |
| | Methylcyclohexane | 1207 ml | |
| | TiCl$_4$ | 31.62 ml | |
| Storage tank 23 | Butyl chloride | 51 ml | 0.59 ml/min |
| | Methylcyclohexane | 49 ml | |
| | α-Picoline | 1.292 ml | |

TABLE 13

| | Before addition of styrene | | After addition of styrene | | |
|---|---|---|---|---|---|
| | Mol. weight distribution peak (Mp) | Distribution (Mw/Mn) | Mol. weight distribution peak (Mp) | Distribution (Mw/Mn) | Yield [%] |
| Ex. 6 | 48000 | 1.32 | 79000 | 1.99 | 92 |

EXAMPLE 7

An experiment was carried out in the same manner as in Example 6 except that the amount of the catalyst charged was 37.2 ml and the amount of the electron donor charged was 1.94 g. In the stirring vessel reactor 25, styrene was added in an amount of 290 moles per mole of p-DCC and the reaction was carried out batch wise for 3 hours. The analytical values for the polymer at the outlet of the reactor 25 (150 minutes after the start of the feeding) and the analytical values for the polymer at the outlet of the reactor 35 were as shown in Table 14. The conversion rate of the monomer component on the occasion of feeding the reaction solution from the reactor 25 to the reactor 26 was 60% by weight.

TABLE 14

| | Before addition of styrene | | After addition of styrene | | |
|---|---|---|---|---|---|
| | Mol. weight distribution peak (Mp) | Distribution (Mw/Mn) | Mol. weight distribution peak (Mp) | Distribution (Mw/Mn) | Yield [%] |
| Ex. 7 | 66000 | 1.30 | 82000 | 2.05 | 92 |

As is evident from the results of Examples 7 and 8, the molecular weight distribution peak values became higher after addition of styrene than before addition. It was thus revealed that the molecular chains had further grown as a result of polymerization of styrene on active termini of the homopolymers to give block copolymers.

INDUSTRIAL APPLICABILITY

As shown in the results of above Examples and Comparative Examples, when the continuous production method of living polymers as proposed by the invention is used, polymers having a narrower molecular weight distribution as compared with the prior art methods can be obtained. This is effective in reducing the viscosity of the liquid polymer obtainable, and it is possible to manifest excellent characteristics in handling the product. Further, by using the continuous polymerization method of the invention, it is possible to react an end capping agent with active termini of the polymer to thereby functionalize the termini as designed. When the functionalized polymer termini are subjected to crosslinking reaction, rubbery products having high strength can be produced. Furthermore, by using the continuous polymerization method of the invention, block copolymers are obtainable.

What is claimed is:

1. A method of producing a polymer
    which comprises feeding a polymerization initiator, a cationically polymerizable monomer component and a catalyst continuously to a flow-through stirring vessel reactor to thereby allow the living polymerization to initiate and
    feeding a reaction solution from said flow-through stirring vessel reactor to a flow-through tubular reactor continuously to thereby allow the living polymerization to proceed,
    said reaction solution having a conversion rate of said cationically polymerizable monomer component of not less than 1% by weight to less than 90% by weight.

2. The production method according to claim 1,
    wherein a functional group-terminated polymer is obtainable by adding an end capping agent to the reaction solution discharged from said flow-through tubular reactor to thereby allow the agent to react with a living polymer terminus.

3. The production method according to claim 1,
    wherein the cationically polymerizable monomer component is an isobutylene-containing monomer component.

4. The production method according to claim 1,
    wherein a block copolymer is obtainable by adding a second cationically polymerizable monomer component other than said cationically polymerizable monomer component to the reaction solution discharged from said flow-through tubular reactor to thereby effect living copolymerization.

5. The production method according to claim 4,
    wherein the first cationically polymerizable monomer component contains isobutylene and the second cationically polymerizable monomer component contains a styrenic.

6. The production method according to claim 1,
    wherein at least one species selected from the group consisting of a halogenated hydrocarbon, an aromatic hydrocarbon and an aliphatic hydrocarbon is used as a reaction solvent.

7. The production method according to claim 1,
    wherein (1) a raw material solution containing said cationically polymerizable monomer component and said polymerization initiator and (2) a raw material solution containing said catalyst are respectively fed continuously to said flow-through stirring vessel reactor and both the raw material solutions are mixed in said reactor to thereby initiate the living polymerization.

8. The production method according to claim 1,
    wherein an electron donor is caused to occur in the reaction system of living polymerization in a concentration of 6 to 500 mol/m$^3$.

9. The production method according to claim 1,
    wherein an electron donor is caused to occur in the reaction system of living polymerization in a mole ratio of 0.10 to 5 relative to a Lewis acid catalyst.

10. The method according to claim 1,
    wherein the reaction solution continuously discharged from the reactor and at least one of the raw material solutions to be fed to the reactor are subjected to heat exchange.

11. The production method according to claim 2,
    wherein the cationically polymerizable monomer component is an isobutylene-containing monomer component.

* * * * *